April 17, 1956        M. L. SMALLEGAN        2,742,139
POULTRY FEEDER
Filed Aug. 25, 1953        2 Sheets—Sheet 1
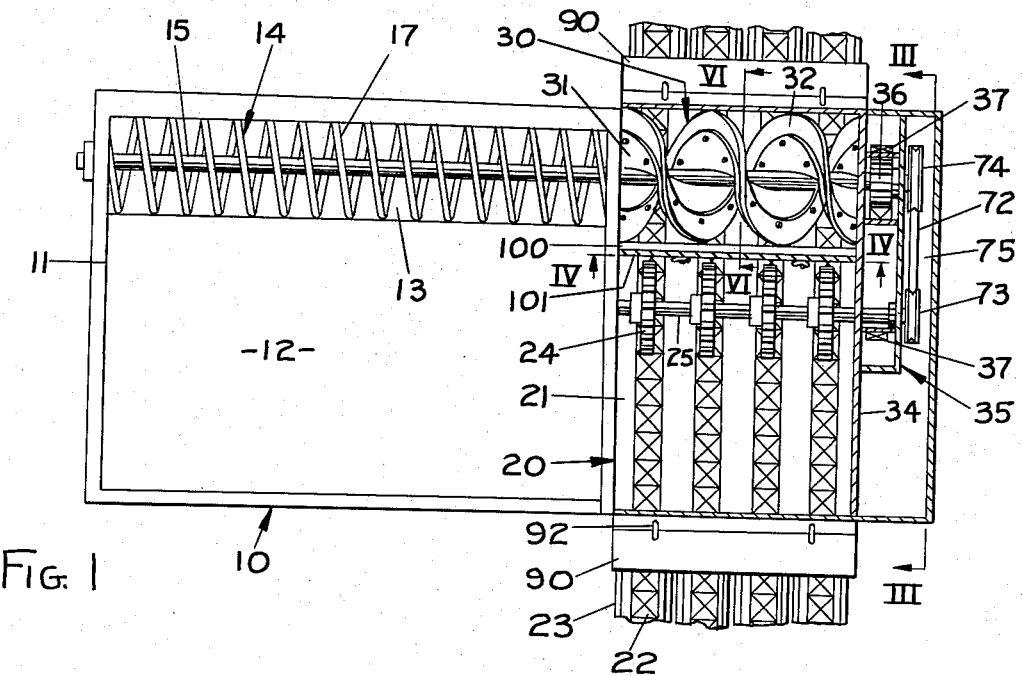
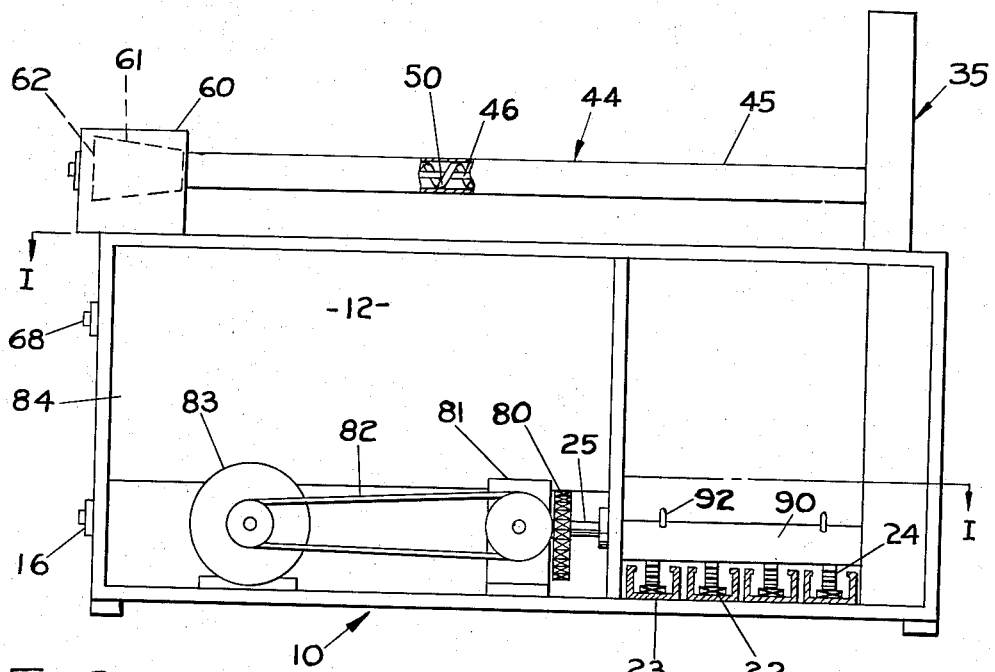
INVENTOR.
MARVIN L. SMALLEGAN
BY
ATTORNEY

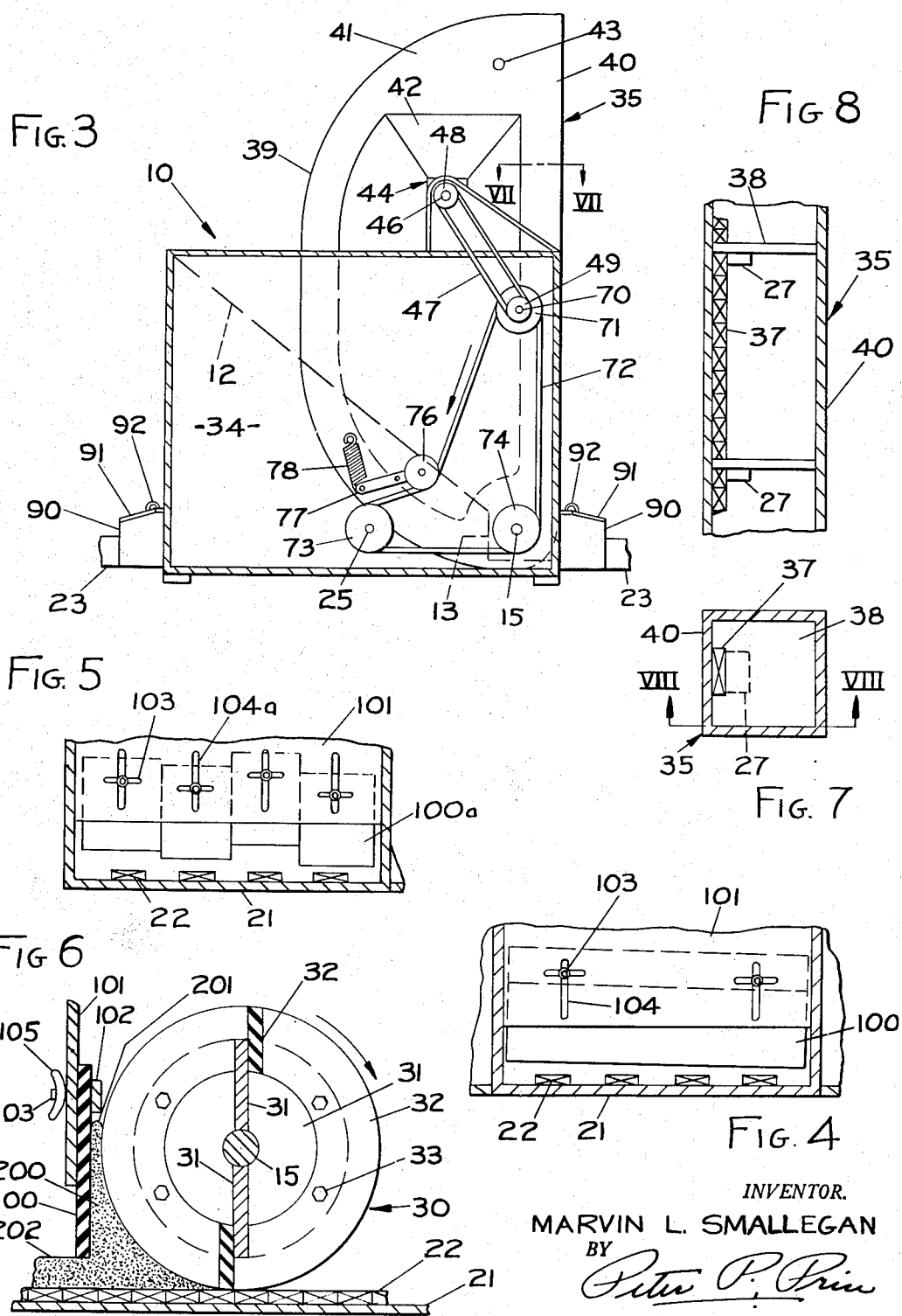

United States Patent Office 2,742,139
Patented Apr. 17, 1956

2,742,139
POULTRY FEEDER

Marvin L. Smallegan, Zeeland, Mich., assignor to Automatic Poultry Feeder Company, Zeeland, Mich., a corporation of Michigan Application August 25, 1953, Serial No. 376,411

14 Claims. (Cl. 198—85)

This invention relates to power driven, chain distributing, automatic, poultry feeding equipment and more particularly to an improved means for assuring an adequate supply of feed in each of a plurality of feed lines passing through a hopper while automatically compensating for fluctuations in the amount of feed returned by each line.

In the automatic feeding of poultry where the feed is distributed by troughs to make it available to the poultry, the feed demand varies from hour to hour. The demand also varies from trough to trough, depending upon the number of birds feeding from the particular trough and the length of the trough. Where a single machine is used to supply feed simultaneously to all of the troughs, serious difficulty has been experienced in properly distributing the feed supply among the troughs while assuring an adequate supply of feed to the troughs having the greatest demands. This must be done without overloading the troughs having smaller demands. There is also the problem of compensating for periods when less feed is withdrawn from all the troughs without necessitating the attention of an operator to periodically adjust the machine.

The use of baffles and similar devices has, to some extent, relieved this problem. The use of timing mechanisms automatically stopping and starting the machine at predetermined intervals has also contributed to some extent toward a solution of this problem. However, these solutions have not solved the basic problem. They do not adequately compensate between troughs having different requirements nor are they capable of meeting unexpected fluctuations in demand. My invention provides a simple but effective solution to this problem. It automatically compensates for demand fluctuations and properly supplies the requirements of troughs having radically different demands without creating a deficiency or surplus in any of the troughs.

My invention is so designed that it may be inexpensively incorporated in existing equipment without radical structural change.

These and other objects and purposes of my invention will be immediately seen by those acquainted with the design and construction of automatic poultry feeding equipment upon reading the following specification and the accompanying drawings.

In the drawings:

Fig. 1 is a sectional view of a hopper equipped with my invention taken along the plane I—I of Fig. 2, not showing the anti-bridging agitator in the hopper.

Fig. 2 is a rear elevation view of a hopper equipped with my invention.

Fig. 3 is a sectional elevation view taken along the plane III—III of Fig. 1.

Fig. 4 is an enlarged, fragmentary, sectional, elevation view taken along the plane IV—IV of Fig. 1.

Fig. 5 is a sectional elevation view of a modified construction for my machine, the view being taken along the same plane as Fig. 4.

Fig. 6 is a fragmentary, sectional, elevation view taken along the plane VI—VI of Fig. 1.

Fig. 7 is a sectional view taken along the plane VII—VII of Fig. 3.

Fig. 8 is a fragmentary, sectional view taken along the plane VIII—VIII of Fig. 7.

In executing the objects and purposes of my invention, I have provided an automatic poultry feeding system having a hopper feeding a plurality of chain operated, feed distribution troughs, in this case four. The feed is removed from the bottom of the hopper by means of a continuously operating helical conveyor having a close pitch. Where the conveyor passes over the distribution chain, the helical is changed to one having a pitch several times greater than that of the helical in the feed hopper proper. Thus, the feed is moved rapidly across the chains with the bottom of the helical accurately determining the height of the feed remaining on the chains. The helical also removes litter and other foreign bodies brought in with the feed returned from the troughs. The excess feed is discharged at the far end of the distributing helical into an elevator. The elevator returns it to the storage compartment of the hopper.

Referring to the drawings in detail, the numeral 10 indicates a hopper having a storage bin 11. The bottom of the storage bin, formed by the baffle 12 (Fig. 3), slopes downwardly toward one side of the hopper where it discharges into a narrow trough 13. Mounted within the trough 13 is a screw type supply conveyor 14. The operating blade 17 of the supply conveyor 14 consists of a rod shaped into the desired helical and mounted about a central shaft 15. The helical rod is substantially spaced from the shaft 15 and thus is generally hollow. The shaft 15 is journalled in one end of the hopper by the bearing 16. The storage bin 11 is either open at the top or provided with a removable cover whereby it may be replenished as needed.

To one side of the feed storage bin 11 is a feed distribution chamber 20 (Fig. 1). The feed distribution chamber 20 has a flat floor 21 upon which ride a plurality of parallel, equally spaced, feed distribution chains 22.

The feed distribution chains 22, throughout a substantial portion of their length, ride in open top troughs 23. The troughs terminate just inside the hopper with sufficient bearing upon the hopper to permit them to be supported and securely anchored. Where the chains 22 pass through the hopper, they rest directly upon the floor 21 and are not surrounded by the troughs. As the chains 22 pass through the chamber 21 they are each engaged by a sprocket 24. The sprockets 24 are mounted upon and driven by a common shaft 25.

The distribution chains 22, upon entering the hopper 10, pass under the distribution conveyor 30. The distribution conveyor 30 is mounted upon the shaft 15 and extends across the distribution chamber 20 from the end of the supply conveyor 14 to the elevator 35.

The distribution conveyor 30 consists of a pair of helical flanges 31 (Figs. 1 and 6) secured to the shaft 15. The flanges 31 are diametrically spaced about the shaft, thus, providing a pair of blades. The flanges 31 are of lesser diameter than the distribution conveyor 30. Mounted to each of the flanges 31 and radially projecting therefrom is a flexible flange 32, preferably made of rubber. The flexible flanges 32 are secured to the rigid, inner flanges 31 by bolts 33. The outer diameter of the flexible flange 32 is such that it sweeps the upper surface of the distribution chains 22.

The pitch of the distribution conveyor 30 is substantially greater than the pitch of the supply conveyor 14.

Preferably it is from two and one-half to six times greater. The purpose of this will appear more fully hereinafter. Since it is mounted to the same shaft 15 as the supply conveyor 14, its angular velocity is identical.

The end of the distribution conveyor 30 discharges through the end wall 34 of the distribution chamber 20 into the bottom of the elevator 35. In the elevator 35, a sprocket 36 (Fig. 1) is mounted on the shaft 15. The sprocket 36 drives a chain 37 (Figs. 1, 7 and 8) equipped with spaced flights 38. The spaced flights 38 are of a size to extend across the opening in the elevator housing 40 and are each supported on the chain by a lug 27. The flights 38 pass under the sprocket 36 gathering up the feed discharged by the distribution conveyor 30 and carry it upwardly through the elevator column 39. Throughout a substantial portion of its length, the conveyor chain 37 is closely confined within a housing 40. At its upper end, the housing has a discharge chamber 41 emptying through its lower end into a funnel 42. Within the discharge chamber 41 is an idler sprocket 20 mounted on a shaft 43.

The collection funnel 42 discharges through its lower end into a conveyor 44 operated by a screw 50 confined within the housing 45. The screw conveyor 44 is above and extends across the top of the hopper 10. The screw 50 is mounted on a shaft 46 (Fig. 2) driven at one end by a belt 47 (Fig. 3) passing over the pulleys 48 and 49.

At the end of the screw conveyor 44 remote from the elevator 35, the housing 45 terminates in a screening chamber enclosed by a hood 60. Within the hood 60 is a frusto-conically shaped screen 61 receiving the feed discharged by the screw conveyor 44. The feed passes through the screen 61 and is returned to the feed bin 11. All other bodies in the material are retained by the screen and discharged at its open end 62. The open end 62 of the screen 61 discharges beyond the end of the hopper 10. The purpose of this is to remove any foreign material such as droppings or straw which may have entered the feed and been returned by the feed troughs. The screen cleans the feed before it is returned to the feed bin. The screen 61 being mounted to the end of the shaft 46 is rotated by the shaft 46. It will be recognized that many different types of screens may be successfully used with this invention. The particular construction of the screen forms no part of this invention.

The pulley 49 is mounted on a shaft 70 operating an antibridging agitator within the feed bin 11. The other end of the shaft 70 is journalled in the bearing 68 (Fig. 2). The agitator is not shown since it forms no part of this invention. The shaft 70 mounts another pulley 71 driven by the belt 72. The belt 72 passes over a driven pulley 73 and a third pulley 74. The pulley 73 is mounted on the shaft 25 and drives the belt 72. The pulley 74 is mounted on the shaft 15 and rotates the conveyors 14 and 30. The pulleys 49, 71, 73 and 74, together with the belts 47 and 72 are all located in the drive chamber 75 (Fig. 1) at one end of the hopper. The belt 72 is tensioned by means of an idler pulley 76 mounted on the pivoted arm 77. The idler pulley is caused to bear tightly against the belt by means of a spring 78.

The shaft 25 is driven by the chain 80 (Fig. 2) which in turn is driven from the speed reducer 81. The speed reducer 81 is driven by means of the belt 82 connecting it to the prime mover 83. The chain 80, speed reducer 81, belt 82 and prime mover 83 are all located within the chamber 84 located beneath and behind the feed bin 11 and below the baffle 12. The chamber 84 is shown as open in Fig. 2 but may be closed by any suitable, removable panel. Also, if desired, a variable speed pulley may be incorporated between the prime mover 83 and the speed reducer 81 to provide variable operating speeds.

Where the feed distribution chains 22 and the troughs 23 enter and leave the hopper, they are enclosed by a guard 90, having a removable cover 91 (Fig. 3). The removable covers are mounted by means of a pair of looped pins 92 permitting them to be detached simply by lifting sufficiently to disengage the pins.

After the feed distribution chains 22 have passed under the distribution conveyor 30, they each pass beneath a gate 100 (Figs. 4 and 6). The gate 100 consists of a thick flexible strip, preferably rubber or fabric embedded in rubber. The gate 100 has a backing strip 102 to which are welded studs 103. The studs 103 project through the gate and vertical slots 104 in the wall element 101. The gate is held by the wing nuts 105 cooperating with the studs 103. The gate 100 is not quite as wide as the distribution chamber 20. Thus, it may be slightly cocked when desired as shown in Fig. 4.

Separate gates 100a may be used for each chain 22 (Fig. 5). The gates 100a are of the same flexible material as the gate 100. Each gate is slotted at 104a for vertical adjustment. Each is independently mounted to the wall element 101 by a bolt and wing nut combination 108. Each gate is long enough to reach the chains 22. The height above the chain is determined by the depth of feed it is desired to maintain on that chain. This depends upon the length of the trough and the number of poultry feeding therefrom. By means of the gates 100, the total amount of feed moving out into each trough may be individually adjusted. If the load on the trough is changed the vertical position of the gate may be adjusted to compensate.

As these machines are presently constructed, this flexibility of adjustment is unnecessary. It may, however, become desirable under future circumstances.

Operation

The bulk feed is placed in the feed bin 11. This feed is slowly withdrawn by the supply conveyor 14. The construction of the conveyor 14 is such that it does not move all of the feed in its path but only a small portion of it, since the center of the conveyor is hollow except for the shaft 15. It is, however, effective to move more than enough feed to adequately supply all the troughs 23. This feed is discharged by the supply conveyor 14 into the distribution compartment 20.

The discharged feed is immediately acted upon by the distribution conveyor 30. Although a number of different pitch combinations can be utilized in the feed supply and the feed distributing conveyors, a pitch of approximately 1½ inches on a supply conveyor 14 of six inch diameter and a pitch of approximately 5 inches on a distribution conveyor 30 of eight inch diameter has proved to be a satisfactory combination. The use of two diametrically positioned, parallel helices on the distribution helical 30 assures adequate contact between the distribution conveyor 30 and the chains 22 to assure constant sweeping of the chains. This maintains a constant, predetermined feed level on the chains as they leave the distribution chamber 20.

The difference in pitch between the supply conveyor and the distribution conveyor causes rapid movement of the feed across the chains 22. This prevents feed from accumulating on the first or second chains and assures adequate feed being supplied to all chains. At the same time, no excess feed is left on any of the chains. The rapid succession with which flights 32 of the distribution conveyor 30 sweep the chains prevents feed accumulation. All excess feed is entirely removed from the distribution chamber 20 by its discharge into the elevator 35.

The change in pitch between the two conveyors prevents the accumulation of excess quantities of feed at the point where the feed bin 11 discharges into the distribution chamber 20. Should feed be allowed to accumulate at this point, the first chain would be overloaded and the proper movement of feed out of the feed bin 11 prevented. Because it is necessary to move the feed slowly out of the feed bin 11, the continuation across the chains of a conveyor with the same pitch as the conveyor 14 could not function properly. It would provide inadequate sweeping action and fail to get the feed across to all of the chains in time to assure even distribution. The chains 22 would carry the feed away too fast.

The distribution conveyor 30 in cooperation with the gate 100 performs another important function. It rolls the feed 200 up in a pile between the conveyor and the gate 100 (Fig. 6). The feed 200 is being constantly rolled in this pile. This rolling action causes the litter and other foreign matter returned by the chains 22 to be accumulated at the top 201 of the pile where it will be safely removed from the feed stream 202 being withdrawn under the gate 100 by the chains 22. This litter will be rapidly conveyed to the side of the distribution chamber where it is discharged into the elevator 35. This sorting action of the conveyor 30 is a major contribution in keeping the feed clean, a serious problem wherever feed is reused.

The excess feed discharged by the distribution conveyor 30 is elevated to the top of the elevator where it is discharged into the conveyor 44. The conveyor 44 transports this feed to the opposite end of the hopper bin 11. This feed contains excess feed from the bin, feed returned by the chains 22 and accumulated trash removed by the distribution conveyor 30.

Removal of the trash is accomplished by means of the screen 61 which returns the feed to the feed bin 11 but screens out the foreign bodies, discharging them over the end of the hopper. If desired, a basket or other container may be placed under the end of the hood 60 to collect these foreign particles for ease in removal.

The conveyor 44 assures the removal of the returned and excess feed to the far end of the hopper. The supply conveyor 14 continuously moves the feed toward the end of the feed bin 11 adjacent the distribution chamber 20. Therefore, there is some tendency for the feed to accumulate at this point. If the feed were returned at this point, it would merely aggravate this situation. By returning the excess feed at the far end of the feed bin, this situation is greatly relieved because the feed has to be moved the full length of the supply conveyor 14 before it can again accumulate at the discharge end of the feed bin 11.

The distribution conveyor 30 assures a constant and adequate supply of feed to each of the chains 22. The particular amount the helix 30 will deposit on each chain will depend upon the amount of feed returned by that chain. If the chain returned empty, it will be entirely filled by the distribution conveyor 30. On the other hand, if the chain returned substantially loaded, only a small quantity will be discharged onto that chain.

The distribution conveyor, however, does not determine the depth of feed leaving the hopper on the chains 22. This is accomplished by means of the gate 100. By varying the height of the gate 100, the level of feed actually leaving the hopper in each trough may be accurately and individually controlled.

It will be recognized that various modifications of my invention may be made each without departing from the principle thereof. Each of these modifications is to be considered as included in the hereinafter appended claims unless these claims by their language expressly state otherwise.

I claim:

1. In automatic poultry feeding equipment having a bulk feed bin, a distribution compartment, a plurality of feed distributing chains passing through said distribution compartment and a prime mover, the improvement comprising: a helical supply conveyor extending along the bottom of said bulk feed bin; said helical supply conveyor discharging into said distribution chamber; a helical distribution conveyor in said distribution compartment above and extending across said chains; a shaft driven by said prime mover mounting both said supply conveyor and said distribution conveyor; the pitch of said distribution conveyor being at least three times that of said supply conveyor; elevator means at the discharge end of said distribution conveyor for returning feed to said bulk feed bin.

2. In automatic poultry feeding equipment having a bulk feed bin, a distribution compartment, a plurality of feed distributing chains passing through said distribution compartment and a prime mover, the improvement comprising: a rotatably mounted shaft extending through the bottom of said bulk feed bin and said distribution chamber; a helical supply conveyor mounted on the portion of said shaft in said bulk feed bin; a helical distribution conveyor mounted on the portion of said shaft in said distribution conveyor; said distribution conveyor having a pitch greater than that of said supply conveyor; said shaft being normal to said distribution chains; elevator means at the discharge end of said distribution conveyor for receiving excess feed.

3. In automatic poultry feeding equipment having a bulk feed bin, a distribution compartment, a plurality of feed distributing chains passing through said distribution compartment and a prime mover, the improvement comprising: a rotatably mounted shaft extending through the bottom of said bulk feed bin and said distribution chamber; a helical supply conveyor mounted on the portion of said shaft in said bulk feed bin; a helical distribution conveyor mounted on the portion of said shaft in said distribution chamber; a radially projecting, flexible peripheral flange mounted on said distribution conveyor; said distribution conveyor having a diameter greater than and a pitch three times that of said supply conveyor; said shaft being normal to said distribution chains; elevator means at the discharge end of said distribution conveyor for receiving excess feed.

4. In automatic poultry feeding equipment having a bulk feed bin, a distribution compartment, a plurality of feed distributing chains passing through said distribution compartment and a prime mover, the improvement comprising: a rotatably mounted shaft extending through the bottom of said bulk feed bin and said distribution chamber; a helical supply conveyor mounted on the portion of said shaft in said bulk feed bin; a helical distribution conveyor mounted on the portion of said shaft in said distribution conveyor; said distribution conveyor having a pair of parallel, diametrically positioned helical blades; a radially projecting, flexible peripheral flange mounted on said distribution conveyor; said distribution conveyor having a pitch greater than that of said supply conveyor; said shaft being normal to said distribution chains; elevator means at the discharge end of said distribution conveyor for receiving excess feed.

5. In automatic poultry feeding equipment having a bulk feed bin, a distribution compartment, a plurality of feed distributing chains passing through said distribution compartment and a prime mover, the improvement comprising: a screw conveyor extending through both said bulk feed bin and said distribution chamber normal to said distribution chains; that portion of said screw conveyor in said distribution chamber having a pitch three times that of the portion of said screw conveyor in said bulk feed bin.

6. In automatic poultry feeding equipment having a bulk feed bin, a distribution compartment adjacent said feed bin, a plurality of feed distributing chains passing through said distribution compartment and a prime mover, the improvement comprising: an elevator at the side of said distribtuion chamber remote from said feed bin; a conveyor in said feed bin for discharging feed therefrom into said distribution chamber; means in said distribution chamber adapted to receive feed from said conveyor and for conveying feed across said distributing chains and discharging excess feed into said elevator; said elevator extending above said bulk feed bin; a return conveyor above said bulk feed bin; the discharge end of said return conveyor being above the end of said bulk feed bin remote from said distribution chamber; means for guiding feed discharged by said elevator into said return conveyor.

7. In automatic poultry feeding equipment having a bulk feed bin, a distribution compartment adjacent said feed bin, a plurality of feed distributing chains passing through said distribution compartment and a prime mover, the improvement comprising: an elevator at the side of said distribution chamber remote from said feed bin; a conveyor in said feed bin for discharging feed therefrom into said distribution chamber; means in said distribution chamber adapted to receive feed from said conveyor and for conveying feed across said distributing chains and discharging excess feed into said elevator; said elevator extending above said bulk feed bin and discharging at its upper end; a screw conveyor above said bulk feed bin; the discharge end of said return conveyor being above the end of said bulk feed bin remote from said distribution chamber; funnel means for guiding feed discharged by said elevator into said screw conveyor.

8. In automatic poultry feeding equipment having a bulk feed bin, a distribution compartment, a plurality of feed distributing chains passing through said distribution compartment and a prime mover, the improvement comprising: a screw conveyor extending through both said bulk feed bin and said distribution chamber normal to said distribution chains; that portion of said screw conveyor in said distribution chamber having a pitch greater than that of the portion of said screw conveyor in said bulk feed bin; a radially projecting, flexible peripheral flange mounted on the portion of said screw conveyor in said distribution chamber; said flexible flange contacting and sweeping the upper surface of said distribution chains.

9. In automatic poultry feeding equipment having a bulk feed bin, a distribution compartment, a plurality of feed distributing chains passing through said distribution compartment and a prime mover, the improvement comprising: a screw conveyor extending through both said bulk feed bin and said distribution chamber normal to said distribution chains; the conveying member of that portion of said screw conveyor in said bulk feed bin being a centrally hollow, helically formed rod; the conveyor member of that portion of said screw conveyor in said distributing chamber being an imperforate helical blade; a radially projecting, flexible peripheral flange mounted on said blade; said blade having a pitch greater than that of said helically formed rod.

10. In automatic poultry feeding equipment having a bulk feed bin, a distribution compartment, a plurality of feed distributing chains passing through said distribution compartment and a prime mover, the improvement which comprises: a screw conveyor extending through both said bulk feed bin and said distribution chamber normal to said distribution chains; the conveying member of that portion of said screw conveyor in said bulk feed bin being a centrally hollow, helically formed rod; the conveying member of that portion of said screw conveyor in said distribution chamber including at least two parallel, equally spaced imperforate helical blades; a radially projecting, flexible, peripheral flange mounted on each of said blades; said blades having a pitch greater than that of said helically formed rod.

11. In automatic poultry feeding equipment having a bulk feed bin, a distribution compartment, a plurality of feed distributing chains passing through said distribution compartment and a prime mover, the combination comprising: a screw conveyor extending through both said bulk feed bin and said distribution chamber normal to said distribution chains; that portion of said screw conveyor in said distribution chamber having a pitch at least three times that of the portion of said screw conveyor in said bulk feed bin; a radially projecting, flexible peripheral flange mounted on the portion of said screw conveyor in said distribution chamber; said flexible flange contacting and sweeping the upper surface of said distribution chains; a vertically oriented tubular housing tracing a closed, loop-shaped path; an endless chain in said housing; a plurality of spaced flights on said chain; a receiving port in said housing communicating with said distribution chamber at the discharge end of said screw conveyor; a discharge port in the upper end of said housing; a helical conveyor extending above said distribution chamber and said bulk feed bin parallel to said screw conveyor; funnel means for guiding feed discharged from said housing into said helical conveyor; a discharge port in said helical conveyor communicating with the end of said bulk feed bin remote from said distribution chamber.

12. In automatic poultry feeding equipment having a bulk feed bin, a distribution compartment, a plurality of feed distributing chains passing through said distribution compartment and a prime mover, the improvement comprising: a screw conveyor extending through both said bulk feed bin and said distribution chamber normal to said distribution chains; that portion of said screw conveyor in said distribution chamber having a pitch three times that of the portion of said screw conveyor in said bulk feed bin; a gate in said distribution chamber; means vertically adjustably mounting said gate immediately adjacent the upwardly moving periphery of said screw conveyor whereby feed will be trapped and rolled between said screw conveyor and said gate.

13. In automatic poultry feeding equipment having a bulk feed bin, a distribution compartment, a plurality of feed distributing chains passing through said distribution compartment and a prime mover, the improvement comprising: a screw conveyor extending through both said bulk feed bin and said distribution chamber normal to said distribution chains; that portion of said screw conveyor in said distribution chamber having a pitch three times that of the portion of said screw conveyor in said bulk feed bin; a semi-rigid gate in said distribution chamber; means vertically adjustably mounting said gate immediately adjacent the upwardly moving periphery of said screw conveyor whereby feed will be trapped and rolled between said screw conveyor and said gate.

14. In automatic poultry feeding equipment having a bulk feed bin, a distribution compartment, a plurality of feed distributing chains passing through said distribution compartment and a prime mover, the improvement comprising: a screw conveyor extending through both said bulk feed bin and said distribution chamber normal to said distribution chains; that portion of said screw conveyor in said distribution chamber having a pitch three times that of the portion of said screw conveyor in said bulk feed bin; a semi-rigid gate in said distribution chamber; a wall in said distribution chamber adjacent the upwardly moving periphery of said screw conveyor; means adapted for vertical adjustment mounting said gate to said wall between said wall and said screw conveyor; said gate and said screw conveyor forming a trap chamber for said feed wherein said feed is rolled and sorted by said screw conveyor.

References Cited in the file of this patent
UNITED STATES PATENTS

| | | |
|---|---|---|
| 270,619 | Weschler | Jan. 16, 1883 |
| 329,498 | Spitzer | Nov. 3, 1885 |
| 2,589,690 | Graetz | Mar. 18, 1952 |